Figure 1:
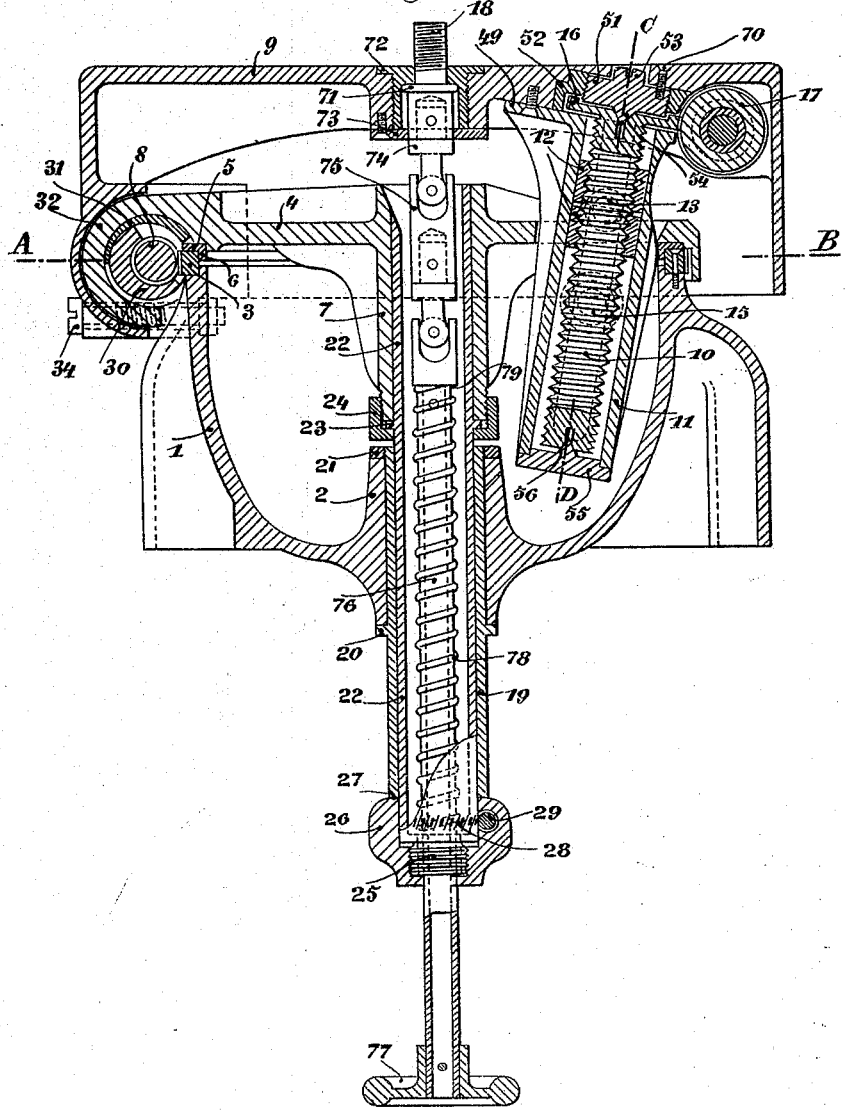

A. DEBRIE.
TRIPOD STAND FOR PANORAMIC CINEMATOGRAPHIC CAMERAS.
APPLICATION FILED MAR. 18, 1914.

1,126,720.

Patented Feb. 2, 1915.
3 SHEETS—SHEET 1.

A. DEBRIE.
TRIPOD STAND FOR PANORAMIC CINEMATOGRAPHIC CAMERAS.
APPLICATION FILED MAR. 18, 1914.

1,126,720.

Patented Feb. 2, 1915.

A. DEBRIE.
TRIPOD STAND FOR PANORAMIC CINEMATOGRAPHIC CAMERAS.
APPLICATION FILED MAR. 18, 1914.
1,126,720.
Patented Feb. 2, 1915.
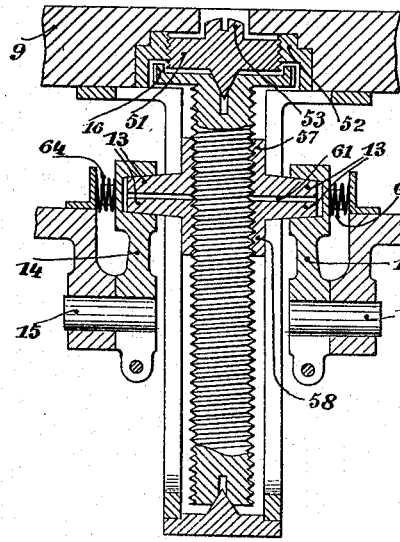
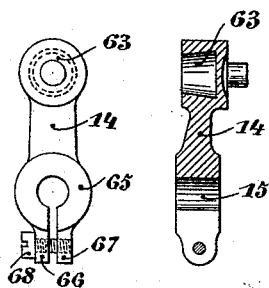
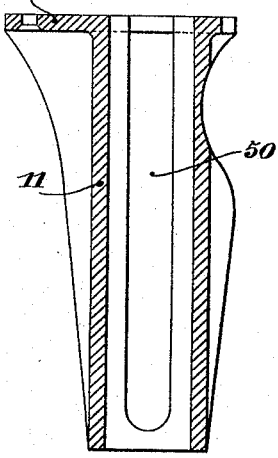
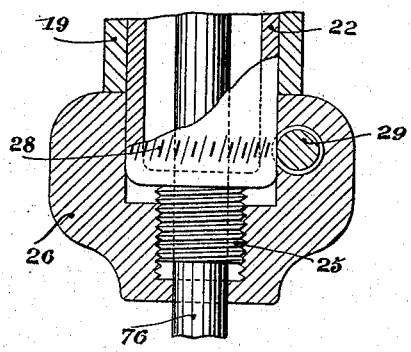
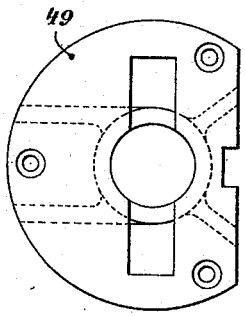

UNITED STATES PATENT OFFICE.

ANDRÉ DEBRIE, OF PARIS, FRANCE.

TRIPOD STAND FOR PANORAMIC CINEMATOGRAPHIC CAMERAS.

1,126,720. Specification of Letters Patent. Patented Feb. 2, 1915.

Application filed March 18, 1914. Serial No. 825,682.

*To all whom it may concern:*

Be it known that I, ANDRÉ DEBRIE, a citizen of the French Republic, residing at Paris, in the Republic of France, have invented certain new and useful Improvements in Tripod Stands for Panoramic Cinematographic Cameras, of which the following is a specification.

The tripod stands for the cameras designed to take panoramic views are generally composed of two superposed platforms, a horizontal rotating panoramic platform provided with a worm engaging with a toothed crown carried by the head of the tripod, and a platform called the "vertical platform" which is adapted to pivot around a horizontal axle supported by the panoramic platform. With a great number of apparatuses of known constructions these two platforms consist of separate parts to be connected with one another only at the moment when the tripod stand is to be used, wherefrom results loss of time, cumbersome size of the apparatus and want of rigidity. With other apparatuses where the two platforms are always connected the one with the other, the "vertical platform" is mounted upon an axle situated above the panoramic platform, wherefrom results cumbersome size and want of rigidity. The different movements of the elements of these tripods are obtained by means of devices without precision which easily wear and consequently have a certain play. The main condition to be fulfilled by a panoramic tripod is that there is no play, that all the movements of its parts are easy and that the cinematographic apparatus moves with perfect continuity. If these conditions are not realized the pictures projected from the films will flicker and jerk.

This invention has for its purpose to improve the construction of a cinematographic tripod in such a manner that the "vertical platform" is pivotable around the axis of the worm carried by the horizontal platform which worm serves for moving the horizontal platform whereby the size of the apparatus is reduced considerably. This "vertical platform" having a downwardly turned flange, forms a kind of cap which covers the head of the tripod and projects the mechanisms. The movement of this platform in vertical direction is obtained by means of a screw which is fixed to said platform and adapted to turn in a nut fixed to the panoramic platform. The different movements of this apparatus are regulated with a view to suppress play and to make the movement easy.

In the accompanying drawings the improved tripod is shown.

Figure 2:
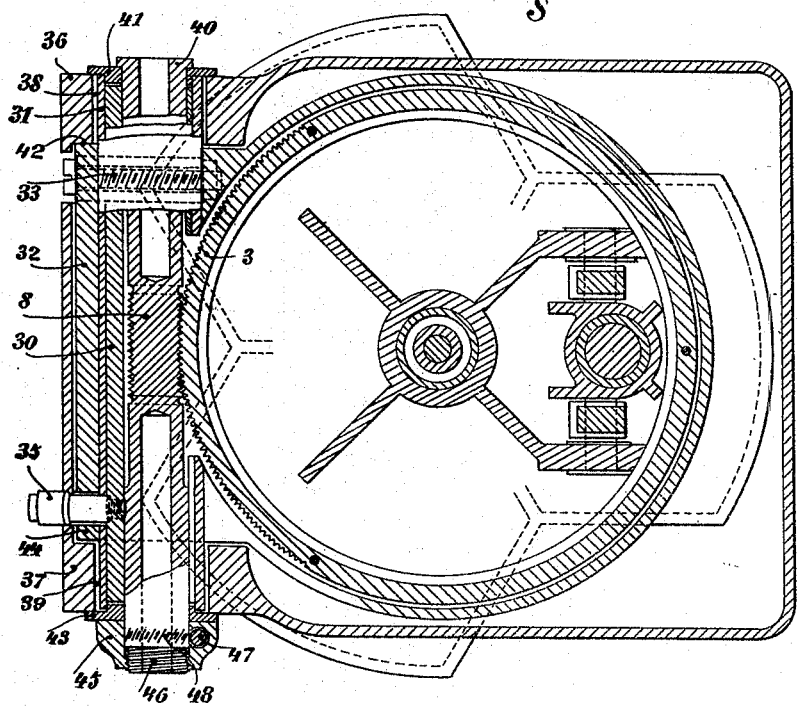
Figure 3:
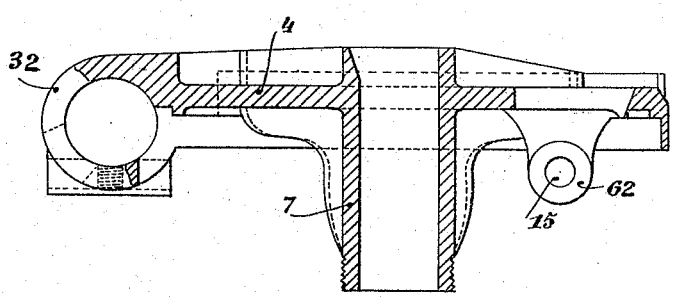

Figure 1 is a vertical section of the head of the tripod. Fig. 2 is a horizontal section on line A—B of Fig. 1 taken in the plane of the axis on the worm of the panoramic platform. Fig. 3 is a vertical section of the panoramic platform. Figs. 4, 5, 6 and 7 show constructional details.

The head 1 of the tripod is mounted upon the three feet which are not shown in the drawing. This head has the shape of a cup. At the center of the bottom of the head 1 a tubular sleeve 2 is arranged. Upon the upper rim of the head 1 a toothed crown 3 is fixed. The panoramic platform 4 rests upon this crown 3 by means of a roller path 5 provided with an inner guide flange 6. A vertical tube 7 projects downwardly from the center of the panoramic platform 4. At one side of the panoramic platform 4 (left hand side Fig. 1) a horizontal tubular casing 32 is arranged which has bearings in which a worm 8 is located which meshes with the teeth of the crown 3.

The upper or "vertical platform" 9 is mounted upon bearings carried by the horizontal tubular casing 32 and which have approximately the same axis as the worm 8. This upper platform 9 has at its right hand side a downwardly projecting screw spindle 10 adapted to turn in a tube 11 fixed to said upper platform. A nut 12 (Figs. 1 and 5) in two parts 57, 58 screwed upon said spindle 10 is located in the tube 11 and has two journals 13 projecting through longitudinal slots of the tube 11 and engaging with bearings carried by arms 14 which are pivotally mounted upon axles 15 fixed to the panoramic platform 4. The screw spindle 10 has at its upper end a toothed crown 16 which meshes with a worm 17 mounted in bearings on the upper platform 9.

The cinematographic camera is fixed upon the upper platform 9 by means of a screw 18.

When the worm 8 is being turned by means of a handle, (not shown in the drawings) it moves along the teeth of the crown 3 and makes the panoramic platform 4 rotate. If the worm 17 is turned by means of a handle (not shown in the drawings) the screw spindle 10 is turned so that, its nut 12 being maintained by the arms 14, it goes up or down and makes the upper platform 9 oscillate around its pivot. During this movement the angle of inclination of the screw spindle 10 with regard to the vertical varies slightly and this movement is compensated by the pivotal arms 14 which support the nut 12.

In order to mount the panoramic platform 4 without any play upon the support 1, a tube 19 is arranged in the tubular sleeve 2 of the support, said tube 19 having a collar 20 which bears against the lower edge of the tubular sleeve. The upper end of the tube 19 is threaded and a ring 21 is screwed upon it which bears upon the upper edge of the tubular sleeve 2.

In the cylindrical sleeve 7 of the panoramic platform a tube 22 is mounted which has a collar 23 bearing against the lower end of said tubular sleeve 7 and pressed against the same by means of an internally threaded cap 24 screwed upon the externally threaded lower end of said tubular sleeve 7. The tube 22 is telescoped into the tube 19 and projects from the lower end of the same. The lower end 25 of the tube 22 is threaded and a nut 26 screwed upon this lower end bears against the lower end 27 of the tube 19. The platform 4 is thus fixed upon the support 1 in such a manner that any play in the rotation of the platform 4 with regard to the support 1 is avoided.

In order to insure the adjustability of the connection between the panoramic platform 4 and the cup-shaped support 1 the nut 26 is secured in its position upon the lower end 25 of the tube 22 by means of a screw 29 located in an appropriate cavity of said nut and engaging with ring-shaped helicoidal teeth 28 on the lower end of said tube 22. If, after the nut 26 has been screwed tightly upon the lower end 25 of the tube 22, the horizontal screw 29 is screwed in, it secures the nut 26 in its position. If the screw 29 is turned the nut 26 is tightened or loosened with great precision. The pressure with which the roller path 5 of the platform 4 is pulled against the crown 3 of the support can be exactly regulated by means of said horizontal screw 29. The teeth 28 cannot react upon the screw 29 as this gearing is irreversible.

The worm 8 is mounted in the casing 32 of the panoramic platform 4 in such a manner that it can be easily thrown in or out of gear which is necessary as the cinematographic apparatus must often be brought from one azimuth to the other, for example, if the subject to be cinematographed has to be changed.

Further, in order to insure the easy movement of the worm and to avoid play, the position of throwing in gear must be determined with great precision. With this object in view the worm 8 is mounted with great eccentricity in a coupling sleeve 30, said sleeve being mounted with little eccentricity in a regulating sleeve 31.

The regulating sleeve 31 is mounted in a wide bearing of the casing 32 of the platform. The position of this regulating sleeve in the bearing is insured by means of helicoidal teeth 33 on said sleeve (Fig. 2) which mesh with a screw 34 screwed into appropriate bearings in the casing 32 so that it stands perpendicular to the axis of the regulating sleeve 31. This screw 34 serves for compensating the wear of the worm 8 and of the teeth of the crown 3. The initial position of this regulating sleeve is such that the worm can be moved toward the teeth of the crown 3.

The coupling sleeve 30 is adapted to turn in said regulating sleeve 31, this turning movement being obtained by means of a finger 35 projecting from the coupling sleeve through a slot in the casing. The end positions of this finger 35 are determined by stops arranged on the casing 32. The worm 8 can be rapidly pushed in gear or moved out of gear with teeth of the crown 3 by a pressure or pull exerted upon said finger 35.

It is not necessary that the coupling position obtained by means of this finger 35 is defined with great precision as this position corresponds with the dead point position of the worm 8 in its eccentric sleeve 31.

The upper platform 9 has collars 36—37 which are mounted upon bearings 38—39 placed over the ends of the regulating sleeve 31.

The regulation of the position of the worm 8 in axial direction and the regulation of the position of its two eccentric sleeves is obtained in the following manner: The worm 8 is turned by means of a collar 40 which through the intermediary of a washer 41 bears upon the collar 36 which in its turn bears upon the end 42 of the tubular casing 32. At the other end a washer 43 bears upon the collar 37 which in its turn bears against the end 44 of the tubular casing 32. The end of the worm 8 is maintained by a safety nut 45 of similar construction to the nut 26 in the tube 22 hereinbefore described with reference to Figs. 1 and 6. This nut 45 is screwed upon the threaded end 46 of the worm 8 and has a tangential screw 47 meshing with helicoidal teeth 48 on the shaft of the worm 8. By the means described a very precise regulation is obtained.

The two sleeves 30, 31 are not fixed in the direction of their axes as this is not necessary.

The screw spindle 10 is mounted in the following manner: The tube 11 Figs. 1 and 4 has a flange 49 at its upper end which bears against the lower surface of the platform 9. The tube 11 has two longitudinal slots 50.

In the lower surface of the platform 9 a cavity is arranged in which a regulating screw 51 and the screw cap 52 of the same are located. The regulating screw 51 has a slotted head 53 located in an aperture of the platform 9 so that it is easily accessible. The nut 51 has further a conical nipple 54 projecting from its lower surface. The bottom plate 55 of the tube 11 has an upwardly projecting conical nipple 56. The screw spindle 10 has appropriate notches at its upper and lower ends with which engage said conical nipples 54 and 56 which thus form the pivots around which said screw spindle can turn.

The nut 12 has conical journals 13 the surface of which is inclined at an angle of about 3°. These journals project through the slots 50 of the tube 11. The nut 12, as well as the journals, are composed of two parts 57, 58 separated by a horizontal gap 61.

The journals 13 are supported by arms 14 adapted to pivot around axles 15 fixed in lugs 62 on the panoramic platform 4.

The journal bearings 63 of the arms 14 are conical.

Springs 64 located between the angle irons fixed to the platform 4 and the outer faces of the arms 14 press said arms continuously toward the journals 13 so that any play between the nut 12 and the screw spindle 10 is avoided.

The collars 65 by means of which the arms 14 are mounted upon the axles 15 are slotted at the lower part and provided with two downwardly projecting arms 66, 67 connected by means of a screw 68 so that any play between the collar 65 of the arm 14 and its axle 15 is suppressed.

For regulating the position of the screw spindle 10 between the conical nipples 54, 56 the regulating screw 51 is turned in its threaded cap 52.

In the upper surface of the regulating screw 51 holes 69 (Fig. 6) are arranged with which a small screw 70 (Fig. 1) can engage arranged in the upper surface of the platform 9. After the position of the regulating screw 51 has been regulated this screw is fixed by means of the small screw 70 engaging with the hole 69 which registers with it. The upper surface of the platform 9 can, for example, have three holes for the stop screw 70 the distance between these three holes being equal to the distance between holes 69 of the regulating screw 51 plus respectively $\frac{1}{3}$ and $\frac{2}{3}$ of this distance whereby a much greater precision is obtained than if there was provided only one hole for the stop screw 70.

The screw 18 which serves for fixing the cinematographic camera upon the platform 9 can be manipulated from below the tripod head by means of the following mechanism: This screw 18 has a flange 71 located in a cavity of a screw stopper 72, said flange being maintained in the cavity by means of a bottom plate 73. In the flange 71 is a link 74 and upon this link 74 a second link 75 is hinged and a rod 76 is mounted upon the lower link. This rod 76 projects through the nut 26 and carries at its lower end a hand wheel 77. A helical spring 78 which is wound around said rod 76 bears with one end upon the bottom of the nut 26 and with the other end against a shoulder 79 on the rod 76 so that the screw 18 is pushed up. In order to fix the cinematographic camera upon the tripod it has simply to be placed upon the platform 9, the elastically mounted screw 18 being pushed back. When said screw registers with the corresponding hole in the bottom plate of the camera it is screwed into the nut of the camera by turning the hand wheel 77.

The rod 76 can participate in the oscillating movements of the platform 9 around its horizontal axle 31 owing to the Cardan joints of the two links 74 and 75.

I claim:

1. A panoramic tripod for cinematographic cameras comprising in combination, a panoramic platform, an upper or "vertical" platform mounted on said panoramic platform and serving as cover for the same, a head of the tripod, a toothed crown on the tripod head, a central tube connecting said panoramic platform with said tripod, a safety nut fixing said tube in position, bearings on the panoramic platform, a regulating sleeve adapted to turn within said bearings, a coupling sleeve mounted with little eccentricity in said coupling sleeve, means for moving the upper platform in vertical direction, means for fixing the cinematographic camera at the center of the upper platform, and means for manipulating the camera from below the tripod head substantially as described and shown and for the purpose set forth.

2. A panoramic tripod for cinematographic cameras comprising in combination, a panoramic platform, an upper or "vertical" platform mounted on said panoramic platform and serving as cover for the same, a head of the tripod, a toothed crown on the tripod head, a central tube connecting said panoramic platform with said tripod, a safety nut fixing said tube in position, means for rotating the cinematographic platform on the tripod, a tubular casing with two opposite slots fixed to the lower surface of said upper platform, a screw spindle in said tubular casing, a toothed crown of said screw spindle, a driving worm in the upper platform meshing with said toothed crown of the tripod head, means for fixing the cinematographic camera at the center of the upper platform, and means for manipulating the camera from below the tripod head, substantially as described and shown and for the purpose set forth.

In witness whereof I have hereunto set my hand in the presence of two witnesses.

ANDRÉ DEBRIE.

Witnesses:
 CHAS. P. PRESSLY,
 ANON BELZIE.

Copies of this patent may be obtained for five cents each, by addressing the " Commissioner of Patents, Washington, D. C."